United States Patent
Beshah et al.

(10) Patent No.: US 10,676,580 B2
(45) Date of Patent: Jun. 9, 2020

(54) PROCESS FOR PREPARING AN AQUEOUS DISPERSION OF POLYMERIC MICROSPHERES

(71) Applicant: Rohm and Haas Company, Collegeville, PA (US)

(72) Inventors: Kebede Beshah, Harleysville, PA (US); James C. Bohling, Lansdale, PA (US); Ibrahim Eryazici, Limerick, PA (US); Philip R. Harsh, Gilbertsville, PA (US); Partha S. Majumdar, Harleysville, PA (US); Edwin Nungesser, Horsham, PA (US)

(73) Assignee: Rohm and Haas Company, Collegeville, PA (US)

( * ) Notice: Subject to any disclaimer, the term of this patent is extended or adjusted under 35 U.S.C. 154(b) by 206 days.

(21) Appl. No.: 15/973,930

(22) Filed: May 8, 2018

(65) Prior Publication Data
US 2018/0327562 A1    Nov. 15, 2018

Related U.S. Application Data

(60) Provisional application No. 62/558,625, filed on Sep. 14, 2017, provisional application No. 62/503,960, filed on May 10, 2017.

(51) Int. Cl.
*C08F 220/18* (2006.01)
*C08F 230/02* (2006.01)
*C08J 7/16* (2006.01)
*C09D 7/42* (2018.01)
*C08F 275/00* (2006.01)
*C08F 285/00* (2006.01)

(52) U.S. Cl.
CPC ............... *C08J 7/16* (2013.01); *C08F 220/18* (2013.01); *C08F 275/00* (2013.01); *C08F 285/00* (2013.01); *C09D 7/42* (2018.01); *C08J 2333/08* (2013.01)

(58) Field of Classification Search
CPC .......... C08F 230/02; C08F 220/18; C08J 7/16
See application file for complete search history.

(56) References Cited

U.S. PATENT DOCUMENTS

| | | |
|---|---|---|
| 7,829,626 B2 | 11/2010 | Chiou et al. |
| 8,686,096 B2 | 4/2014 | Deetz et al. |
| 2016/0369359 A1 | 12/2016 | Gallagher et al. |
| 2017/0058116 A1* | 3/2017 | Ando ......................... C08F 2/18 |
| 2017/0096575 A1 | 4/2017 | Cui et al. |

* cited by examiner

*Primary Examiner* — Vu A Nguyen
(74) *Attorney, Agent, or Firm* — Reid Willis

(57) ABSTRACT

The present invention relates to an aqueous dispersion of a class of organic phosphate functionalized microspheres having a particle size in the range of from 1 μm to 25 μm, and a process for preparing the dispersion. The microspheres, which have a low coefficient of variation and low gel concentration, are useful in coatings applications, especially where a matte finish is desired.

19 Claims, No Drawings

PROCESS FOR PREPARING AN AQUEOUS DISPERSION OF POLYMERIC MICROSPHERES

BACKGROUND OF THE INVENTION

The present invention relates to a process for preparing an aqueous dispersion of polymeric microspheres.

Aqueous dispersions of polymeric microspheres having a particle size in the range of from 1.1 µm to 25 µm are useful in compositions that form coatings with a matte (low gloss) finish, for example, as a clear top coat for leather that is smooth to the touch. The preparation of such dispersions are described in U.S. Pat. No. 7,829,626.

Preparing these aqueous polymeric microspheres with excellent particle size uniformity and a minimum formation of particles in the range of from 20 nm to 500 nm (fines) remains a challenge. The presence of fines above threshold levels results in the formation of unacceptable levels of gel, which requires arduous removal, thereby increasing batch times; in many instances, batches have to be discarded entirely.

US 2017/0058116 (Ando) discloses a method for producing microspheres by suspension polymerization with reported excellent dispersion stability, but requires an extra step of preparing cellulose functionalized small particles, which are adsorbed to the surface of the microspheres to provide such stability. Moreover, Ando's examples all report coefficients of variation in the range of 32% to 50%. It would therefore be advantageous to discover a method that produces monodisperse microspheres with acceptably low production of gel, and that does not require the presence of small particles adsorbed to the surface of the microspheres.

SUMMARY OF THE INVENTION

The present invention addresses a need in the art by providing, in a first aspect, a process comprising the step of contacting, under polymerization conditions, an aqueous dispersion of first microspheres comprising structural units of a first monoethylenically unsaturated nonionic monomer with first stage monomers comprising, based on the weight of the first stage monomers, from a) 0.05 to 5 weight percent of a polymerizable organic phosphate or a salt thereof; and b) from 70 to 99.95 weight percent of a second monoethylenically unsaturated nonionic monomer, to grow out the first microspheres to form an aqueous dispersion of organic phosphate functionalized second microspheres, wherein the first microspheres have a particle size in the range of from 1 µm to 15 µm and the second microspheres have a particle size in the range of from 1.1 µm and 25 µm; and wherein the polymerizable organic phosphate is represented by the following formula:

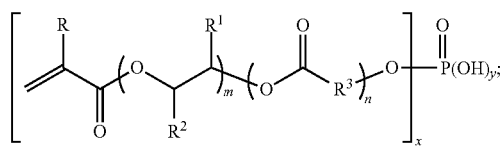

or a salt thereof; wherein R is H or $CH_3$, wherein $R^1$ and $R^2$ are each independently H or $CH_3$, with the proviso that no two adjacent $CR^2CR^1$ groups are each substituted with methyl groups; each $R^3$ is independently linear or branched $C_2$-$C_6$ alkylene; m is from 2 to 10; n is from 0 to 5; x is 1 or 2; and y is 1 or 2; and x+y=3.

In a second aspect, the present invention is a composition comprising an aqueous dispersion of polymeric microspheres functionalized with from 0.05 to 5 weight percent, based on the weight of the microspheres, of a polymerizable organic phosphate or a salt thereof, which polymerizable organic phosphate is represented by the following formula:

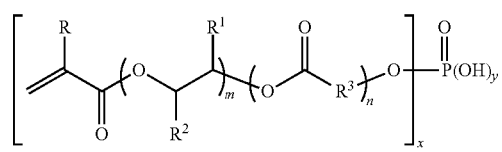

or a salt thereof; wherein R is H or $CH_3$, wherein $R^1$ and $R^2$ are each independently H or $CH_3$, with the proviso that no two adjacent $CR^2CR^1$ groups are each substituted with methyl groups; each $R^3$ is independently linear or branched $C_2$-$C_6$ alkylene; m is from 2 to 10; n is from 0 to 5; x is 1 or 2; and y is 1 or 2; and x+y=3; wherein the polymeric microspheres have a solids content in the range of from 10 to 60 weight percent, based on the weight of the microspheres and water; wherein the polymeric microspheres have a particle size in the range of from 1 µm to 25 µm and a coefficient of variation of less than 25%; and wherein the dispersion comprises less than 1 weight percent gel, based on the weight of the composition.

The process of the present invention provides a way to control microsphere size with a low coefficient of variation and low gel formation.

DETAILED DESCRIPTION OF THE INVENTION

The present invention is a process comprising the step of contacting, under polymerization conditions, an aqueous dispersion of first microspheres comprising structural units of a first monoethylenically unsaturated nonionic monomer with first stage monomers comprising, based on the weight of the first stage monomers, from a) 0.05 to 5 weight percent of a polymerizable organic phosphate or a salt thereof; and b) from 70 to 99.95 weight percent of a second monoethylenically unsaturated nonionic monomer, to grow out the first microspheres to form an aqueous dispersion of organic phosphate functionalized second microspheres, wherein the first microspheres have a particle size in the range of from 1 µm to 15 µm and the second microspheres have a particle size in the range of from 1.1 µm and 25; and wherein the polymerizable organic phosphate is represented by the following formula I:

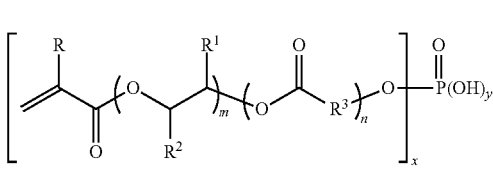

or a salt thereof; wherein R is H or $CH_3$, wherein $R^1$ and $R^2$ are each independently H or $CH_3$, with the proviso that no two adjacent $CR^2CR^1$ groups are each substituted with methyl groups; each $R^3$ is independently linear or branched $C_2$-$C_6$ alkylene; m is from 2 to 10; n is from 0 to 5; x is 1 or 2; and y is 1 or 2; and x+y=3.

In a preferred aspect of the present invention, n is 0, x is 1, and y is 2, which gives the structure of Formula II:

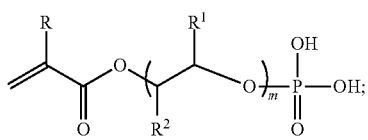

Preferably, each $R^2$ is H and each $R^1$ is $CH_3$, or each $R^2$ is $CH_3$ and each $R^1$ is H; more preferably, each $R^2$ is H and each $R^1$ is $CH_3$; m is preferably from 3, and more preferably from 4; to preferably to 8, and more preferably to 6. Sipomer PAM-100, Sipomer PAM-200 and Sipomer PAM-600 phosphate esters are examples of commercially available compounds of Formula II.

In another preferred aspect of the present invention, n is 1; m is 1; R is $CH_3$; $R^1$ and $R^2$ are each H; $R^3$ is -$(CH_2)_5$-; x is 1 or 2; y is 1 or 2; and x+y=3, resulting in structure of Formula III:

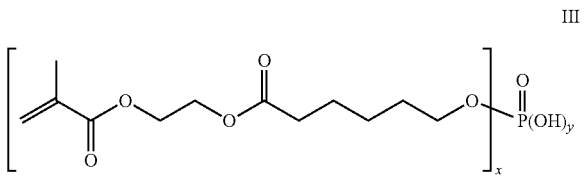

A commercially available compound within the scope of Formula III is Kayamer PM-21 phosphate ester.

As used herein, the term "structural unit" of the named monomer, refers to the remnant of the monomer after polymerization. For example, a structural unit of a subgenus of polymerizable organic phosphates is illustrated by the following structure:

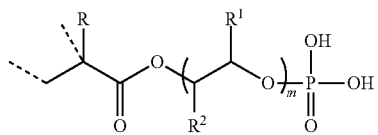

Where R, $R^1$, $R^2$, and m are previously defined, and wherein the dotted lines represent the points of attachment of the structural unit to the microsphere.

Particles size as referenced to microspheres refers to median weight average ($D_{50}$) particle size as measured by Disc Centrifuge Photosedimentometer, as described herein below. Particle size as referenced to latex particles refers the average particle size as measured by a Brookhaven BI 90 Plus Particle Analyzer.

The first microspheres preferably comprise from 90 to 99.9 weight percent structural units of a monoethylenically unsaturated nonionic monomer, examples of which include acrylates such as ethyl acrylate, butyl acrylate, and 2-ethylhexyl acrylate; methacrylates such as methyl methacrylate, n-butyl methacrylate, t-butyl methacrylate, hydroxyethyl methacrylate, hydroxypropyl methacrylate, acetoacetoxyethyl methacrylate, and ureido methacrylate; acrylonitrile; acrylamides such as acrylamide and diacetone acrylamide; styrene; and vinyl esters such as vinyl acetate. Although it is possible for the first microspheres to include structural units of carboxylic acid monomers such as methacrylic acid or acrylic acid, it is preferred that the first microspheres comprise less than 5, more preferably less than 3, and most preferably less than 1 weight percent structural units of a carboxylic acid monomer, based on the weight of the microspheres. The first microspheres more preferably comprise structural units of acrylates or methacrylates or combinations of acrylates and methacrylates.

The first microspheres are advantageously prepared from an aqueous dispersion of an oligomeric seed having a weight average molecular weight ($M_w$) in the range of from 800, preferably from 1000 g/mol to 20,000, preferably to 10,000 and most preferably to 5000 g/mol as determined by size exclusion chromatography using polystyrene standards as described herein. The oligomeric seed has an average diameter in the range of from 200 nm, more preferably from 400 nm, and most preferably from 600 nm, to 8000 nm, preferably to 5000 nm, more preferably to 1500 nm, and most preferably to 1000 nm, as determined by disc centrifuge photosedimentometry (DCP), as described herein. The oligomeric seed contains a structural of a chain transfer agent such as an alkyl mercaptan, examples of which include n-dodecyl mercaptan, 1-hexanethiol, 1-octane thiol, and 2-butyl mercaptan.

The oligomeric seed is advantageously contacted with a first monoethylenically unsaturated monomer in the presence of a hydrophobic initiator, in any order, to transport the initiator into the seed, or seed swollen with monomer. As used herein, a hydrophobic initiator refers to an initiator having a water solubility in the range of from 5 ppm, preferably from 10 ppm, to 10,000, preferably to 1000, and more preferably to 100 ppm. Examples of suitable hydrophobic initiators include such as t-amyl peroxy-2-ethylhexanoate (water solubility=17.6 mg/L at 20° C.) or t-butyl peroxy-2-ethylhexanoate (water solubility=46 mg/L at 20° C.). The extent of swelling (seed growth) can be controlled by the ratio of the monomer to the seed. Examples of suitable monoethylenically unsaturated nonionic monomers include acrylates such as ethyl acrylate, butyl acrylate, and 2-ethylhexyl acrylate; methacrylates such as methyl methacrylate, n-butyl methacrylate, t-butyl methacrylate, hydroxyethyl methacrylate, hydroxypropyl methacrylate, acetoacetoxyethyl methacrylate, and ureido methacrylate; acrylonitrile; acrylamides such as acrylamide and diacetone acrylamide; styrene; and vinyl esters such as vinyl acetate.

Forming microspheres from oligomeric seed provides an effective way of controlling the particle size distribution of the microspheres. Preferably, the coefficient of variation of the first and the second microspheres, as determined by DCP, is less than 25%, more preferably less than 20%, more preferably less than 15%, and most preferably less than 10%. Preferably, the concentration of gel formed in the process of preparing the aqueous dispersion of second microspheres is preferably less than 0.5, more preferably less than 0.2, more preferably less than 0.1, and most preferably less 0.05 weight percent, based on the weight of the aqueous dispersion. Dispersions of microspheres with low coefficients of variation ultimately result in coatings with reliable and reproducible properties in end-use applications. In contrast, microspheres with coefficients of variation greater than 30% give coatings with unreliable and unpredictable properties. From the standpoint of quality control, it is advantageous to have coefficients of variation less achieved by the dispersions of the present invention. It is also advantageous to prepare dispersions of microspheres with low gel formation to reduce time lost to filtration and wastage of product. Preferably, the particle size of the first microspheres is in the range of from 2.5 µm, more preferably from 3.0 µm, preferably to 12 µm, more preferably to 10 µm.

In a preferred process of the present invention, the aqueous dispersion of first microspheres is contacted under polymerization conditions and in the presence of an emulsifying surfactant, such as a phosphate or an alkyl benzene sulfonate or sulfate, with first stage monomers comprising, based on the weight of the first stage monomers, from 0.05, preferably from 0.1, and more preferably from 0.2 weight percent, to 5, preferably to 3, more preferably to 2, and most preferably to 1 weight percent of the polymerizable organic phosphate or a salt thereof; and from 70, more preferably from 80, and most preferably from 90 weight percent, to 99.95, preferably to 99.8 weight percent of a second monoethylenically unsaturated nonionic monomer. The first microspheres increase in volume (grow out) to form an aqueous dispersion of organic phosphate functionalized second microspheres having a particle size in the range of from 1.1 µm, and preferably from 2.5 µm, preferably from 3.5 µm, to 25 µm, more preferably to 20 µm, and most preferably to 15 µm.

The first stage monomer preferably further comprises a multiethylenically unsaturated nonionic monomer, preferably at a concentration in the range of from 0.1, more preferably from 1, and most preferably from 2 weight percent, to 15, more preferably to 10, and most preferably to 8 weight percent, based the weight of first stage monomers. Examples of suitable multiethylenically unsaturated nonionic monomers include allyl methacrylate, allyl acrylate, divinyl benzene, trimethylolpropane trimethacrylate, trimethylolpropane triacrylate, butylene glycol (1,3) dimethacrylate, butylene glycol (1,3) diacrylate, ethylene glycol dimethacrylate, and ethylene glycol diacrylate. The inclusion of these multiethylenically unsaturated nonionic monomers is particularly preferred where further staging of the organic phosphate functionalized second microspheres is desired.

The first stage monomer as well as the second microspheres preferably comprises a substantial absence of structural units of a carboxylic acid monomer. As used herein, a substantial absence of structural units of a carboxylic acid monomer means less than 5, preferably less than 3, more preferably less than 1, and most preferably less than 0.2 weight percent structural units of a carboxylic acid monomer such as methacrylic acid or acrylic acid, based on the weight of the microspheres.

The second microspheres preferably comprise from 90 to 98 weight percent structural units of a second monoethylenically unsaturated nonionic monomer, which may be the same as or different from the first monoethylenically unsaturated nonionic monomer. It is understood that "monomer" refers to one or more monomers.

It is preferred that the aqueous dispersion of first microspheres is contacted under polymerization conditions with an excess of the polymerizable organic phosphate (or salt thereof) so that the resultant dispersion of organic phosphate functionalized second microspheres comprises unreacted organic phosphate. The presence of unreacted (carryover) polymerizable organic phosphate or salt thereof is especially advantageous if further staging of the second microspheres is desired. For example, it may be desirable to prepare a dispersion of second microspheres with a $T_g$ of less than 25° C., as calculated by the Fox equation, then further stage the second microspheres with carryover organic phosphate and additional monoethylenically unsaturated nonionic monomer (second stage ethylenically unsaturated nonionic monomer), which may be the same as of different from the first stage monoethylenically unsaturated nonionic monomer, to yield a dispersion of organic phosphate functionalized third microspheres with a domain having a $T_g$ of less than 25° C., and a domain with a $T_g$ of greater than 50° C. The domains may form, for example, a core-shell morphology or a so-called "chocolate chip cookie" morphology. A water-soluble initiator/redox couple such as t-butyl hydroperoxide and isoascorbic acid (t-BHP/IAA) is advantageously used to form a gradient core-shell morphology.

Where initiator/redox couple is used, it has been discovered that further formation of gel is dramatically attenuated if the polymerization is carried out at a pH that is at least one pH unit higher than the first $pK_a$ of the residual polymerizable organic phosphate. Preferably, the polymerization step to prepare the aqueous dispersion of third microspheres is carried out at a pH of from at least 3, more preferably from at least 4, more preferably from at least 5, and most preferably from at least 6, to preferably 12, more preferably to 10 and most preferably to 8. Thus, the polymerizable organic phosphate used to make the aqueous dispersion of third microspheres preferably is predominantly present in the salt form, preferably as the lithium, sodium, potassium, trialkylammonium, or ammonium salt.

Additional polymerizable organic phosphate may be added in the further staging of the second microspheres, preferably in the desired pH range where initiator/coupler is used. It is especially preferred to use the salt of Formula II where each $R^2$ is H and each $R^1$ is $CH_3$, or each $R^2$ is $CH_3$ and each $R^1$ is H, or Formula III.

In a second aspect, the present invention is a composition comprising an aqueous dispersion of polymeric microspheres functionalized with from 0.05 to 5 weight percent, based on the weight of the microspheres, of the polymerizable organic phosphate or a salt thereof, wherein the polymeric microspheres have a solids content in the range of from 10 to 60 weight percent, based on the weight of the microspheres and water, a particle size in the range of from 1 µm to 25 µm, and a coefficient of variation of less than 25%; and wherein the dispersion comprises less than 1 weight percent gel, based on the weight of the composition. Preferably, the solids content is in the range of from 20, more preferably from 25, and most preferably from 30 weight percent, to 50, more preferably to 45 weight percent, based on the weight of the microspheres and water.

Preferably the dispersion comprises less than 0.5, more preferably less than 0.2, and most preferably less than 0.1 weight percent gel, based on the weight of the composition, calculated as described in the Examples section. In another aspect, the polymeric microspheres are functionalized with an ammonium salt of the polymerizable organic phosphate, preferably at a concentration in the range from 0.2 to 2 weight percent, based on the weight of the microspheres.

The aqueous dispersion of microspheres is useful in coatings applications, especially where a matte finish is desired. Examples of such applications include leather, plastic packaging, wood, architectural coatings, and industrial coatings. The aqueous dispersion of microspheres may optionally include one or more additional components such as binders, thickeners, pigments, biocides, solvents, dispersants, and extenders.

It has been discovered that an aqueous dispersion of microspheres can be prepared with a low coefficient of variation and with low gel formation. It has further been discovered that such microspheres advantageously comprise a substantial absence of adsorbing latex particles having a particle size in the range of from 20 to 500 nm, more particularly, a substantial absence of adsorbing latex particles functionalized with cellulose. As used herein, "substantial absence" refers to less than 0.3, preferably less than 0.1, more preferably less than 0.05, and most preferably 0 weight percent of the latex particles adsorbed to the microspheres, based on the weight of the microspheres.

EXAMPLES

Molecular Weight Determination of Acrylic Oligomer Seed

The dispersion of acrylic oligomer seed (0.1 g) were dissolved in tetrahydrofuran (THF, 8 g, HPLC grade) then filtered through 0.45 μm PTFE filters. Size Exclusion Chromatography (SEC) separations were carried out on a liquid chromatograph equipped with an Agilent 1100 Model isocratic pump, a vacuum degasser, a variable injection size autosampler, and an Agilent 1100 HPLC G1362A Refractive Index detector. The data was processed with Agilent ChemStation, version B.04.03 and Agilent GPC-Addon version B.01.01. GPC separations were carried out using THF as an eluent at a flow rate of 1 mL/min using a GPC column set composed of two PLgel Mixed D columns (300×7.5 mm ID, 5 μm) and a guard column (50×7.5 mm ID, 5 μm). Ten polystyrene standards were fitted with a 1st order fit calibration curve. The weight average molecular weights ($M_w$) of the standards were as follows: 630; 1,370; 2,930; 4,900; 10,190; 22,210; 50,550; 111,400; 214,700; and 363,600. Data was collected using a refractive index (RI) detector.

DCP Particle Sizing Methods for Acrylic Oligomer Seed and Microspheres

Particle sizes and distribution were measured using Disc Centrifuge Photosedimentometer (DCP, CPS Instruments, Inc., Prairieville, La.) that separates modes by centrifugation and sedimentation through a sucrose gradient. The samples were prepared by adding 1 to 2 drops of the oligomer seed dispersion or the microsphere dispersion into 10 mL of deionized (DI) water containing 0.1% sodium lauryl sulfate, followed by injection of 0.1 mL of the sample into a spinning disc filled with 15 g/mL of sucrose gradient. For the oligomer seed, a 0-4% sucrose gradient disc spinning at 10,000 rpm was used, and a 596-nm polystyrene calibration standard was injected prior to injection of the sample. For the microspheres, a 2-8% sucrose gradient disc spinning at 3,000 rpm was used, and 9-μm polystyrene calibration standard was injected prior to injection of the sample. Median weight average ($D_{50}$) particle size and coefficient of variation (CV) were calculated using instrument's algorithm.

Method for Measuring Gel Formation

Pre-weighted sample (200 to 4,000 g) were poured through 20/100/325-mesh stacked screens (in decreasing pore size from top to bottom); each screen was washed with copious amounts of water and gel was collected separately and dried at 150° C. for 30 min. The gel data is calculated as the weight ratio of the collected total dry gel in each screen over the total sample size:

gel %=dry gel/total sample×100; gel ppm=dry gel/total sample×$10^6$.

Example 1-Preparation of an Aqueous Dispersion of Acrylic Beads

An aqueous dispersion of acrylic oligomer seed (33% solids, 67 butyl acrylate/18 n-dodecyl mercaptan/14.8 methyl methacrylate/ 0.2 methacrylic acid) with a weight average median particle size ($D_{50}$) of 885 nm and a coefficient of variation of 5%, as determined by DCP, and a weight average molecular weight of 2532 g/mole was prepared substantially as described in U.S. Pat. No. 8,686,096, Examples 1 and 5 (col. 19 and 20). This seed was used to prepare the microspheres of all the Examples and Comparative Examples described herein.

Initiator emulsion was prepared by combining in a separate vial deionized water (4.9 g), Rhodacal DS-4 branched alkylbenzene sulfonate (DS-4, 0.21 g, 22.5% aq. solution), 4-hydroxy 2,2,6,6-tetramethylpiperidine (4-hydroxy TEMPO, 0.4 g), t-amyl peroxy-2-ethylhexanoate (TAPEH, 5.42 g, 98% active), then emulsified for 10 min with a homogenizer at 15,000 rpm. The initiator emulsion was then added to the dispersion of the acrylic oligomer seed (4.2 g, 32% solids) in a separate vial and mixed for 60 min. A shot monomer emulsion (shot ME) was prepared in a separate flask by combining deionized water (109.5 g), Solvay Sipomer PAM-200 phosphate esters of PPG monomethacrylate (PAM-200, 1.3 g, 97% active), DS-4 (4.13 g, 22.5% solution), 4-hydroxy TEMPO (0.2 g), n-butyl acrylate (BA, 251.5 g), and allyl methacrylate (ALMA, 10.5 g). Deionized water (1575 g) was added to a 5-L round bottom flask (reactor) fitted with a stirrer, condenser, and a temperature probe. The reactor was heated to 70° C., after which time the initiator and oligomer seed mixture was added to the reactor, and Shot ME was fed into the reactor over 15 min. After an induction period of 30 min, the resultant exotherm caused the reactor temperature to rise to 80° C. The particle size of the microspheres formed in this step as measured by DCP was 4.9 μm.

A first monomer emulsion (ME1, prepared by combining deionized water (328.5 g), PAM-200 (3.9 g), DS-4 (12.38 g, 22.5% solution), 4-hydroxy TEMPO (0.6 g of), BA (754.5 g), and ALMA (31.5 g) was then fed into the reactor over 55 min. After a 20-min hold, $NH_4OH$ (1.35 g, 28% aq.) was fed into the reactor over 3 min. The particle size of the microspheres formed in this step as measured by DCP was 8.3 μm.

The reactor temperature was cooled to and maintained at 75° C., after which time $FeSO_4 7H_2O$ (11 g, 0.15% aq) and EDTA tetrasodium salt (2 g, 1% aqueous solution) were mixed and added to reactor. A second monomer emulsion (ME2) was prepared in a separate flask by combining deionized water (90 g), DS-4 (3.2 g, 22.5% solution), methyl methacrylate (MMA, 254 g), and ethyl acrylate (EA, 10.9 g). ME2, t-butyl hydroperoxide solution (t-BHP, 1.44 g (70% aq.) in 100 g water) and isoascorbic acid (IAA, 1.05 g in 100 g water) was fed into the reactor over 45 min. The residual monomers were then chased by feeding t-BHP solution (2.54 g (70% aq.) in 40 g water) and IAA (1.28 g in 40 g water) into the reactor over 20 min. The consequent dispersion was filtered through a 45-μm screen; gel that remained on the screen was collected and dried (270 ppm). The filtrate was analyzed for percent solids (33.2%), coefficient of variation (7.9%), and particle size (8.4 μm, as measured by DCP).

Example 2-Preparation of an Aqueous Dispersion of Acrylic Beads without 4-Hydroxy TEMPO and no ME2 Step Initiator emulsion was prepared by combining in a separate vial deionized water (4.9 g), DS-4 (0.21 g, 22.5% aq.

solution), TAPEH (5.42 g, 98% active), then emulsified for 10 min with a homogenizer at 15,000 rpm. The initiator emulsion was then added to the dispersion of the acrylic oligomer seed (12.8 g, 32% solids) in a separate vial and mixed for 60 min. A shot ME was prepared in a separate flask by combining deionized water (109.5 g), PAM-200 (1.3 g, 97% active), DS-4 (4.13 g, 22.5% solution), and ALMA (10.5 g). Deionized water (1575 g) was added to a 5-L round bottom flask (reactor) fitted with a stirrer, condenser, and a temperature probe. The reactor was heated to 70° C., after which time the initiator and oligomer seed mixture was added to the reactor, and shot ME was fed into the reactor over 15 min. After an induction period of 30 min, the resultant exotherm caused the reactor temperature to rise to 80° C. The particle size of the microspheres formed in this step as measured by DCP was 3.6 µm.

ME1 was prepared by combining deionized water (328.5 g), PAM-200 (3.9 g), DS-4 (12.38 g, 22.5% solution), BA (754.5 g), and ALMA (31.5 g) was then fed into the reactor over 55 min. Residual monomers were polymerized by raising the reactor temperature to 90° C. and holding for 30 min. The particle size of the microspheres formed in this step as measured by DCP was 6.1 µm. The percent solids was 32.0%, the coefficient of variation was 7.2%, and gel formation was 100 ppm.

Example 3-Preparation of an Aqueous Dispersion of Acrylic Beads with PAM-100 and No ME2 Step Initiator emulsion was prepared by combining in a separate vial deionized water (4.9 g), DS-4 (0.21 g, 22.5% aq. solution), 4-hydroxy TEMPO (0.4 g), TAPEH (5.42 g, 98% active), then emulsified for 10 min with a homogenizer at 15,000 rpm. The initiator emulsion was then added to the dispersion of the acrylic oligomer seed (12.8 g, 32% solids) in a separate vial and mixed for 60 min. A shot ME was prepared in a separate flask by combining deionized water (109.5 g), DS-4 (4.13 g, 22.5% solution), 4-hydroxy TEMPO (0.2 g), BA (251.5 g), and ALMA (10.5 g). Deionized water (1575 g) was added to a 5-L round bottom flask (reactor) fitted with a stirrer, condenser, and a temperature probe. The reactor was heated to 70° C., after which time the initiator and oligomer seed mixture was added to the reactor, and shot ME was fed into the reactor over 15 min. After an induction period of 30 min, the resultant exotherm caused the reactor temperature to rise to 80° C. The particle size of the microspheres formed in this step as measured by DCP was 3.5 µm.

ME1, which was prepared by combining deionized water (328.5 g), Solvay Sipomer PAM-100 phosphate esters of PPG monomethacrylate (PAM-100, 3.9 g, 98% active), DS-4 (12.38 g, 22.5% solution), 4-hydroxy TEMPO (0.6 g of), BA (754.5 g), and ALMA (31.5 g), was then fed into the reactor over 55 min. After a 20-min hold, NH$_4$OH (1.35 g 28% aq.) was fed into the reactor over 3 min. Residual monomers were polymerized by raising the reactor temperature to 90° C. and holding for 30 min. The particle size of the microspheres formed in this step as measured by DCP was 5.9 µm. The percent solids was 32.0%, the coefficient of variation was 7.2%, and gel formation was 1400 ppm.

Example 4-Preparation of an Aqueous Dispersion of Acrylic Beads without PAM-200 in ME1 Step The process of was carried out essentially as described for Example 1 except that 12.8 g of acrylic oligomer seed was used; PAM-200 was not included in shot ME; NH$_4$OH (0.80 g, 28% aq) was used to neutralize the microspheres formed from ME1; PAM-600 phosphate esters of PPG monomethacrylate (PAM-600, 6.33 g, 60% active) was included in ME1 in place of PAM-200; PAM-600 (2.30 g, 60% active) was used in ME2 in place of PAM-200; and 88 g of water was used in the preparation of ME2. The particle size of the microspheres was 3.5 µm following the shot ME polymerization step; 5.7 µm following the ME1 polymerization step; and 6.0 µm following the ME2 polymerization step, as measured by DCP. The percent solids was 33.2%, the coefficient of variation of the microspheres formed at the end of ME2 was 8.8%, and gel formation was 300 ppm.

Example 5-Preparation of an Aqueous Dispersion of Acrylic Beads with PAM-600

The process of was carried out essentially as described for Example 4 except that 1 g of acrylic oligomer seed was used; PAM-600 (2.18 g, 60% active) was included in shot ME; PAM-600 (6.53 g, 60% active) was used in ME1; PAM-600 (2.2 g, 60% active) was used in ME2; and NH$_4$OH (1.44 g, 28% aq) was used to neutralize the microspheres formed from MEL The particle size of the microspheres was 7.0 µm following the shot ME polymerization step; 11.8 µm following the ME1 polymerization step; and 11.8 µm following the ME2 polymerization step, as measured by DCP. The percent solids was 33.4%, the coefficient of variation of the microspheres formed at the end of ME2 was 9.9%, and gel formation was 800 ppm.

Example 6-Preparation of an Aqueous Dispersion of Acrylic Beads with PAM-600

The process of was carried out essentially as described for Example 4 except that t-butyl peroxy-2-ethylhexanoate (TB-PEH, 5.42 g, 98% active) was used as the initiator and the initiator emulsion was shot added to the dispersion of the acrylic oligomer seed after the addition of shot ME followed by a 30-min hold; and PAM-600 (2.11 g, 60% active) was included in shot ME. The particle size of the microspheres was 3.4 µm following the shot ME polymerization step; 5.7 µm following the ME1 polymerization step; and 5.8 µm following the ME2 polymerization step, as measured by DCP. The percent solids was 33.0%, the coefficient of variation of the microspheres formed at the end of ME2 was 5.7%, and gel formation was 600 ppm.

Example 7-Preparation of an Aqueous Dispersion of MMA functionalized Acrylic Beads The process of was carried out essentially as described for Example 5 except that 4.2 g acrylic oligomer seed was used; in shot ME, BA was reduced (from 251.50 g to 198.50 g), and MMA (53.0 g) was included; in ME1, BA was reduced (from 754.50 g to 595.50 g) and MMA (159.0 g) was included; and NH$_4$OH (0.75 g, 28% aq) was used to neutralize the microspheres formed from MEL The particle size of the microspheres was 4.8 µm following the shot ME polymerization step; 7.8 µm following the ME1 polymerization step; and 8.0 µm following the ME2 polymerization step, as measured by DCP. The percent solids was 33.4%, the coefficient of variation of the microspheres formed at the end of ME2 was 9.6%, and gel formation was 1300 ppm.

Example 8-Preparation of an Aqueous Dispersion of Acrylic Beads with Kayamer PM-21 Phosphate Ester The process of was carried out essentially as described for Example 1. In this example, Kayamer PM-21 phosphate ester (PM-21) was used in place of PAM-200, and in the same amounts, in shot ME and ME1; NH$_4$OH (2.10 g, 28% aq) was used to neutralize the microspheres formed from ME1; PM-21 (1.37 g, 97% active) was used in ME2; NH$_4$OH (0.4 g, 28% aq) was used to neutralize the PM-21 in ME2; and water (88 g) was used in the preparation of ME2. The particle size of the microspheres was 8.2 µm following the ME2 polymerization step, as measured by DCP. The percent solids was 33.1%, the coefficient of variation of the microspheres formed at the end of ME2 was 10.7%, and gel formation was 620 ppm.

Comparative Example 1-Preparation of an Aqueous Dispersion of Acrylic Beads with PEM and No ME2 step Initiator emulsion was prepared by combining in a separate vial deionized water (4.9 g), DS-4 (0.21 g, 22.5% aq. solution), 4-hydroxy TEMPO (0.4 g), TAPEH (5.42 g, 98% active), then emulsified for 10 min with a homogenizer at 15,000 rpm. The initiator emulsion was then added to the dispersion of the acrylic oligomer seed (4.2 g, 32% solids) in a separate vial and mixed for 60 min. Shot ME was prepared in a separate flask by combining deionized water (109.5 g), DS-4 (4.13 g, 22.5% solution), 4-hydroxy TEMPO (0.2 g), BA (251.5 g), and ALMA (10.5 g). Deionized water (1575 g) was added to a 5-L round bottom flask (reactor) fitted with a stirrer, condenser, and a temperature probe. The reactor was heated to 70° C., after which time the initiator and oligomer seed mixture was added to the reactor, and shot ME was fed into the reactor over 15 min. After an induction period of 30 min, the resultant exotherm caused the reactor temperature to rise to 80° C. The particle size of the microspheres formed in this step as measured by DCP was 4.5 µm; the coefficient of variation of the microspheres was 4.8%.

A first monomer emulsion (ME1) was prepared by combining deionized water (328.5 g), phosphoethyl methacrylate (PEM, 3.9 g, 60% active), DS-4 (12.38 g, 22.5% solution), 4-hydroxy TEMPO (0.6 g of), BA (754.5 g), and ALMA (31.5 g) was then fed into the reactor over 55 min. After a 20-min hold, NH$_4$OH (1.5 g, 28% aq.) was fed into the reactor over 3 min. Residual monomers were polymerized by raising the reactor temperature to 90° C. and holding for 30 min. The particle size and coefficient of variation of the microspheres were found to be broad but were otherwise could not be measured reliably. Gel formation was 6.0% and percent solids was 26.1%.

Comparative Example 2-Preparation of an Aqueous Dispersion of Acrylic Beads with No Polymerizable Phosphate Surfactant Shot ME was prepared in a separate flask by combining deionized water (109.5 g), DS-4 (4.13 g, 22.5% solution), BA (251.5 g), and ALMA (10.5 g). Deionized water (1575 g) was added to a 5-L round bottom flask (reactor) fitted with a stirrer, condenser, and a temperature probe. The reactor was heated to 70° C., after which time the acrylic oligomer seed mixture was added to the reactor followed by addition of shot ME over 15 min. After a 30-min hold, initiator emulsion—prepared by combining in a separate vial deionized water (4.9 g), DS-4 (0.21 g, 22.5% aq. solution), TBPEH (5.54 g, 98% active), then emulsified for 10 min with a homogenizer at 15,000 rpm—was shot added. After an induction period of 30 min, the resultant exotherm caused the reactor temperature to rise to 80° C. The sample was not measured for gel.

ME1, prepared by combining deionized water (328.5 g), DS-4 (12.38 g, 22.5% solution), BA (754.5 g), and ALMA (31.5 g), was then fed into the reactor over 55 min. The presence of a large quantity of fines and gel, as well as particle instability, resulted in unreliable determination of microsphere particle size.

The reactor temperature was cooled to and maintained at 75° C., after which time FeSO$_4$7H$_2$O (10 g, 0.15% aq) and IAA (0.15 gin 5 g of water) were mixed and added to reactor. ME2 was prepared in a separate flask by combining deionized water (90 g), DS-4 (3.2 g, 22.5% solution), MMA (252 g), and EA (10.9 g). ME2, t-BHP (1.44 g (70% aq.) in 100 g water) and IAA (0.9 g in 100 g of water) were fed into the reactor over 45 min. The residual monomers were then chased by feeding t-BHP solution (2.54 g, (70% aq.) in 40 g water) and IAA (1.28 g in 40 g water) into the reactor over 20 min. The consequent dispersion was filtered through a 45-µm screen; gel that remained on the screen was collected and dried (2.0%). The filtrate was analyzed for percent solids (32.2%), coefficient of variation (7.9%), and particle size (5.3 µm), as measured by DCP.

Comparative Example 3-Preparation of an Aqueous Dispersion of Acrylic Beads with PAM-100 in ME2

The procedure of Example 3 was substantially repeated, except that the amount of acrylic oligomer seed was reduced to 4.2 g, and PAM-100 (1.3 g) was used in shot ME. The particle size was 8 µm, the coefficient of variation was 8.4%, and gel formation was 800 ppm prior to polymerization with ME2. This dispersion was neutralized with NH$_4$OH (1.6 g, 28% aq) and the reactor temperature was cooled to and maintained at 75° C., after which time FeSO$_4$7H$_2$O (11 g, 0.15% aq) and EDTA tetrasodium salt (2 g, 1% aqueous solution) were mixed and added to reactor. ME2 was prepared in a separate flask by combining deionized water (88 g), NH$_4$OH (0.4 g, 28% aq), DS-4 (3.2 g, 22.5% solution), MMA (250 g), EA (10.4 g), and PAM-100 (1.3 g). ME2, t-BHP (1.44 g (70% aq.) in 100 g water) and IAA (1.05 g in 100 g water) were fed into the reactor over 45 min. The residual monomers were then chased by feeding t-BHP solution (2.54 g (70% aq.) in 40 g water) and IAA (1.28 g in 40 g water) into the reactor over 20 min. The consequent dispersion was filtered through a 45-µm screen; gel that remained on the screen was collected and dried (4.0%). The percent solids was 30.9%, the particle size and coefficient of variation of the microspheres formed at the end of ME2 could not be accurately determined due to gel formation (4%).

The data show the importance of using PAM-100, PAM-200, PAM-600, PM-21 in ME1 to form microspheres with low (<11%) coefficients of variation and minimal gel formation. Surprisingly, PEM is not suitable for this purpose. Furthermore, the data show that neutralized PAM-200 (equivalent to PAM-600) and PM-21 were found to be the only polymerizable phosphates in the ME2 step that formed microspheres with low coefficient of variation and low gel formation.

The invention claimed is:

1. A process comprising the step of contacting, under polymerization conditions, an aqueous dispersion of first microspheres comprising structural units of a first monoethylenically unsaturated nonionic monomer with first stage monomers comprising, based on the weight of the first stage monomers, from a) 0.05 to 5 weight percent of a polymerizable organic phosphate or a salt thereof; and b) from 70 to 99.95 weight percent of a second monoethylenically unsaturated nonionic monomer, to grow out the first microspheres to form an aqueous dispersion of organic phosphate functionalized second microspheres, wherein the first microspheres have a particle size in the range of from 1 μm to 15 μm and the second microspheres have a particle size in the range of from 1.1 μm and 25 μm; and wherein the polymerizable organic phosphate is represented by the following formula:

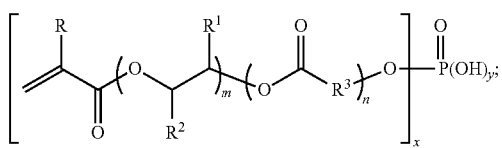

or a salt thereof; wherein R is H or $CH_3$, wherein $R^1$ and $R^2$ are each independently H or $CH_3$, with the proviso that no two adjacent $CR^2CR^1$ groups are $CH(CH_3)CH(CH_3)$ groups; each $R^3$ is independently linear or branched $C_2$-$C_6$ alkylene; m is from 2 to 10; n is from 0 to 5; x is 1 or 2; and y is 1 or 2; and x+y=3; or n is 1; m is 1; R is $CH_3$, $R^1$ and $R^2$ are each H; $R^3$ is -$(CH_2)_5$-; x is 1 or 2; y is 1 or 2; and x+y=3; wherein the first microspheres comprise a substantial absence of adsorbing cellulose coated latex particles having a particle size in the range of from 20 nm to 500 nm.

2. The process of claim 1 wherein the first microspheres have a particle size in the range of from 2.5 μm to 12 μm, and the second microspheres have a particle size in the range of from 4.5 μm to 20 μm; and wherein the organic phosphate monomer is represented by
 a) the compound of formula II:

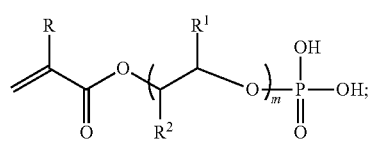

or a salt thereof; and m is from 3 to 8; or
 b) the compound of formula III:

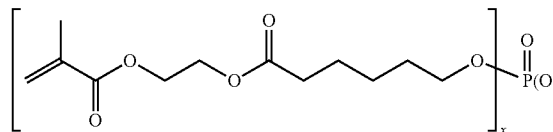

3. The process of 1 wherein first stage monomers further comprise from 0.1 to 15 weight percent, based on the weight of first stage monomers, of a multiethylenically unsaturated nonionic monomer.

4. The process of claim 1 wherein the first microspheres are prepared by a) contacting monomers with an aqueous dispersion of an oligomeric seed in the presence of a hydrophobic initiator; and b) polymerizing the monomers; wherein the oligomer seed has a weight average molecular weight in the range of from 800 to 20,000 g/mol and an average diameter in the range of from 200 nm to 8000 nm.

5. The process of claim 2 wherein the aqueous dispersion of first microspheres is contacted under polymerization conditions with an excess of the polymerizable organic phosphate or salt thereof so that the resultant dispersion of organic phosphate functionalized second microspheres comprises unreacted polymerizable organic phosphate.

6. The process of claim 5 wherein the dispersion of organic phosphate functionalized second microspheres is further reacted with a second stage monoethylenically unsaturated nonionic monomer, in the presence of a water-soluble initiator/redox couple, and at a pH in the range of from 4 to 10, to form a dispersion of third microspheres.

7. The process of claim 6 wherein the second stage monoethylenically unsaturated monomer polymerizes with the dispersion of organic phosphate functionalized second microspheres to form a dispersion of organic phosphate functionalized third microspheres with a domain having a $T_g$ of less than 25° C., and a domain having a $T_g$ of greater than 50° C.

8. The process of claim 5 wherein the excess polymerizable organic phosphate is represented by the lithium, sodium, potassium, trialklyammonium, or ammonium salt the compound of Formula II:

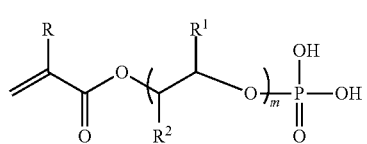

where each $CR^2CR^1$ group is either $CH(CH_3)CH_2$ or $CH_2CH(CH_3)$; and m is from 4 to 6; or the compound of Formula III:

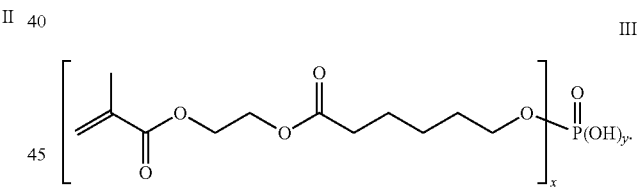

9. A composition comprising an aqueous dispersion of polymeric microspheres functionalized with from 0.05 to 5 weight percent, based on the weight of the microspheres, of a polymerizable organic phosphate or a salt thereof, which polymerizable organic phosphate is represented by the following formula:

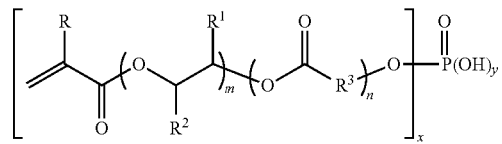

or a salt thereof; wherein R is H or $CH_3$, wherein $R^1$ and $R^2$ are each independently H or $CH_3$, with the proviso that no two adjacent $CR^2CR^1$ groups are $CH(CH_3)CH(CH_3)$ groups; each $R^3$ is independently linear or branched $C_2$-$C_6$ alkylene; m is from 2 to 10; n is from 0 to 5; x is 1 or 2; and y is 1 or 2; and x+y =3; or n is 1; m is 1; R is CH$_3$, R$^1$ and R$^2$ are each H; R$^3$ is -(CH$_2$)$_5$-; x is 1 or 2; y is 1 or 2; and x+y=3; wherein the polymeric microspheres have a solids content in the range of from 10 to 60 weight percent, based on the weight of the microspheres and water; wherein the polymeric microspheres have a particle size in the range of from 1 μm to 25 μm and a coefficient of variation of less than 25%; and wherein the dispersion comprises less than 1 weight percent gel, based on the weight of the composition.

10. The composition of claim 9 wherein the polymeric microspheres are functionalized with from 0.2 to 2 weight percent, based on the weight of the microspheres, of an ammonium salt of the polymerizable organic phosphate represented by either of the following formula:

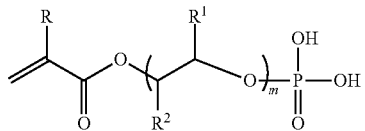

II where m is from 4 to 6; and where each CR$^2$CR$^1$ group is either CH(CH$_3$)CH$_2$ or CH$_2$CH(CH$_3$); or

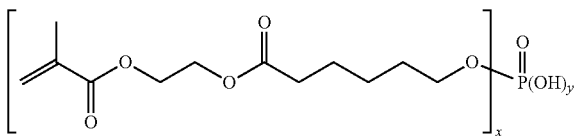

III where x is 1 or 2; and y is 1 or 2; and x+y=3.

11. The composition of claim 10 wherein the polymeric microspheres comprise structural units of methyl methacrylate and one or more monomers selected from the group consisting of ethyl acrylate, butyl acrylate, and allyl methacrylate; wherein the dispersion comprises less than 0.5 weight percent gel, based on the weight of the composition.

12. The composition of claim 10 wherein the polymeric microspheres comprise structural units of methyl methacrylate, ethyl acrylate, butyl acrylate, and allyl methacrylate.

13. A process comprising the steps of:
 a) contacting monomers with an aqueous dispersion of an oligomeric seed in the presence of a hydrophobic initiator;
 b) polymerizing the monomers to form an aqueous dispersion of first microspheres; wherein the oligomer seed has a weight average molecular weight in the range of from 800 to 20,000 g/mol and an average diameter in the range of from 200 nm to 8000 nm;
 c) contacting, under polymerization conditions, an aqueous dispersion of first microspheres comprising structural units of a first monoethylenically unsaturated nonionic monomer with first stage monomers comprising, based on the weight of the first stage monomers, from a) 0.05 to 5 weight percent of a polymerizable organic phosphate or a salt thereof; and b) from 70 to 99.95 weight percent of a second monoethylenically unsaturated nonionic monomer, to grow out the first microspheres to form an aqueous dispersion of organic phosphate functionalized second microspheres, wherein the first microspheres have a particle size in the range of from 1 μm to 15 μm and the second microspheres have a particle size in the range of from 1.1 μm and 25 μm; and wherein the polymerizable organic phosphate is represented by:
 a) the compound of formula II:

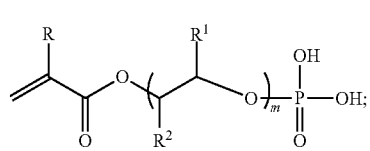

II or a salt thereof; where R$^1$ and R$^2$ are each independently H or CH$_3$, with the proviso that no two adjacent CR$^2$CR$^1$ groups are CH(CH$_3$)CH(CH$_3$) groups; and m is from 3 to 8; or
 b) the compound of formula III:

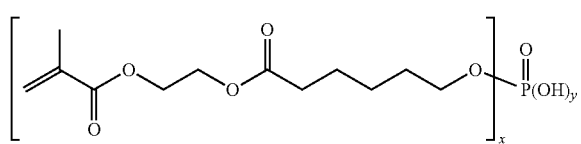

III or a salt thereof; where x is 1 or 2; y is 1 or 2; and x+y=3.

14. The process of claim 13 wherein the aqueous dispersion of first microspheres is contacted under polymerization conditions with an excess of the polymerizable organic phosphate or salt thereof so that the resultant dispersion of organic phosphate functionalized second microspheres comprises unreacted polymerizable organic phosphate.

15. The process of claim 14 wherein the dispersion of organic phosphate functionalized second microspheres is further reacted with a second stage monoethylenically unsaturated nonionic monomer, in the presence of a water-soluble initiator/redox couple, and at a pH in the range of from 4 to 10, to form a dispersion of third microspheres.

16. The process of claim 15 wherein the second stage monoethylenically unsaturated monomer polymerizes with the dispersion of organic phosphate functionalized second microspheres to form a dispersion of organic phosphate functionalized third microspheres with a domain having a T$_g$ of less than 25° C., and a domain having a T$_g$ of greater than 50° C.

17. The process of claim 16 wherein the excess polymerizable organic phosphate is represented by the lithium, sodium, potassium, trialklyammonium, or ammonium salt the compound of Formula II:

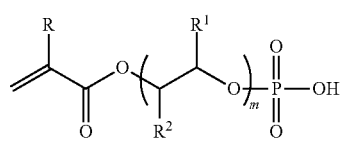

II where each CR$^2$CR$^1$ group is either CH(CH$_3$)CH$_2$ or CH$_2$CH(CH$_3$); and m is from 4 to 6; or the compound of Formula III:

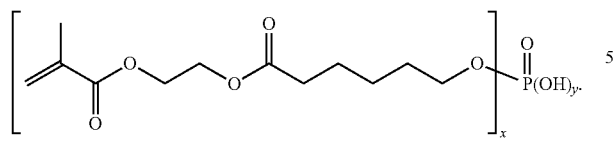
III
18. The composition of claim 10 wherein the microspheres comprise structural units of acrylate and methacrylate monomers.
19. The composition of claim 10 wherein the microspheres comprise structural units of methyl methacrylate, butyl acrylate, and allyl methacrylate.
* * * * *